United States Patent [19]
Dominick

[11] Patent Number: 6,065,332
[45] Date of Patent: *May 23, 2000

[54] METHOD AND APPARATUS FOR SENSING AND DISPLAYING TORSIONAL VIBRATION

[75] Inventor: John McEwen Dominick, Bucksburn, United Kingdom

[73] Assignee: Halliburton Energy Services, Inc., Houston, Tex.

[*] Notice: This patent issued on a continued prosecution application filed under 37 CFR 1.53(d), and is subject to the twenty year patent term provisions of 35 U.S.C. 154(a)(2).

[21] Appl. No.: 08/852,007

[22] Filed: May 6, 1997

[51] Int. Cl.$^7$ ................................................... E21B 47/00
[52] U.S. Cl. .................................. 73/152.47; 73/152.43; 73/152.58; 175/56
[58] Field of Search ........................... 73/152.16, 152.43, 73/152.47, 152.48, 152.49, 152.58; 175/40, 56; 702/9

[56] References Cited

U.S. PATENT DOCUMENTS

| | | | |
|---|---|---|---|
| 3,703,096 | 11/1972 | Vitter, Jr. et al. | 324/152.47 |
| 3,714,822 | 2/1973 | Lutz | 73/152.43 X |
| 4,150,568 | 4/1979 | Berger et al. | 73/152.47 |
| 4,773,263 | 9/1988 | Lesage et al. | 73/152.45 |
| 4,928,521 | 5/1990 | Jardine | 73/152.43 |
| 5,321,981 | 6/1994 | Macpherson | 73/152.43 |
| 5,448,911 | 9/1995 | Mason | 73/152.47 |

OTHER PUBLICATIONS

Fear et al., "Experience in the Detection and Suppression of Torsional Vibration From Mud Logging Data," pp. 433–448, Oct. 1994, Society of Petroleum Engineers, Inc.
A.A. Besaisow et al., "Application of ADAMS (Advanced Drilling Analysis and Measurement System) and Improved Drilling Performance," pp. 717–722, Feb. 1990, IADC/SPE Drilling Conference.
J.D. Macpherson et al., "Surface Measurement and Analysis of Drillstring Vibrations While Drilling," pp. 953–963, Feb. 1993, SPE/IADC Drilling Conference.
S.I. Jardine et al., "Estimating Tooth Wear From Roller Cone Bit Vibration," pp. 459–466, Feb. 1990, IADC/SPE Drilling Conference.
S.S. Chen et al., "Added Mass and Damping of a Vibrating Rod in Confined Viscous Fluids," pp. 325–329, Jun. 1976, Journal of Applied Mechanics.
M.S. Robson et al., "Benefits of Complementary Surface Vibration and MWD Drilling Mechanics Measurements in a Horizontal Well," pp. 129–147, Feb. 1993, SPE/IADC Drilling Conference.
A.K. Booer et al., "Drillstring Imaging: An Interpretation of Surface Drilling Vibrations," pp. 425–432, Feb. 1992, IADC/SPE Drilling Conference.
A. Kyllingstad et al., "A Study of Slip/Stick Motion of the Bit," pp. 369–373, Dec. 1988, SPE Drilling Engineering.
T.V. Aarrestad et al., "Measurements and Theoretical Models on Rig Suspension and the Effect on Drillstring Vibrations," pp. 331–344, Oct. 1989, Society of Petroleum Engineers.
G.W. Halsey, "Drillstring Torsional Vibrations: Comparison Between Theory and Experiment on a Full–Scale Research Drilling Rig," pp. 1–10, Oct. 1986, Society of Petroleum Engineers.
G.W. Halsey, "Torque Feedback Used to Cure Slip–Stick Motion," pp. 277–282, Oct. 1988, Society of Petroleum Engineers.

*Primary Examiner*—Daniel S. Larkin
*Attorney, Agent, or Firm*—Fletcher, Yoder & Van Someren

[57] ABSTRACT

A method and apparatus for sensing and displaying the magnitude of torsional vibrations. A transducer provides a signal indicative of the torsional vibrations being experienced by a rotating member. The magnitude of the frequency components of the signal are determined and displayed to an operator who may take corrective action.

17 Claims, 4 Drawing Sheets

METHOD AND APPARATUS FOR SENSING AND DISPLAYING TORSIONAL VIBRATION

BACKGROUND OF THE INVENTION

1. Field of the Invention

This invention relates generally to methods and apparatus for measuring the operating characteristics of a rotating member. More particularly, this invention relates to methods and apparatus for sensing and displaying torsional vibrations associated with a drill string.

2. Description of the Related Art

During drilling operations, a drill string is subjected to axial, lateral, and torsional loads stemming from a variety of sources. In the context of a rotating drill string, torsional loads are imparted to the drill string by the rotary table, which rotates the drill string, and by the interference between the drill string and the wellbore. Axial loads act on the drill string as a result of the successive impacts of the drill bit on the cutting face, and as a result of irregular vertical feed rate of the drill string by the driller. The result of this multitude of forces applied to the drill string is a plurality of vibrations introduced into the drill string. The particular mode of vibration will depend on the type of load applied. For example, variations in the torque applied to the drill string will result in a torsional vibration in the drill string.

At the surface, torsional vibration in the drill string appears as a regular, periodic cycling of the rotary table torque. The torsional oscillations usually occur at a frequency that is close to a fundamental torsional mode of the drill string, which depends primarily on the drill pipe length and size, and the mass of the bottom hole assembly (BHA). The amplitude of the torsional vibrations depends upon the nature of the frictional torque applied to the drill string downhole, as well as the properties of the rotary table. Torsional vibrations propagating in a drill string are significant in that they are ordinarily accompanied by alternating acceleration and deceleration of the BHA and bit, as well as repeated twisting of the drill pipe section of the drill string.

Relatively high magnitudes of torsional vibrations are produced in the drill string by what is known in the industry as stick-slip behavior of the bit and BHA. At the outset of a stick-slip event, the rotation of the drill string grinds to a halt and the rotary table begins to stall due to the excessive buildup of torque in the drill string. As the rotary table continues to rotate, torque builds in the drill string as it twists. If the rotary table has sufficient torque capacity to overcome the resistance to rotation of the bit and BHA, the drill string will release and rotate in an uncontrolled condition, up to some maximum speed that is a function of the friction acting on the entire length of the drill string. The buildup of torque causes the drill string to shorten, while the uncontrolled rotation tends to lengthen the drill string.

The stick-slip phenomena represents the extreme outcome of high magnitude torsional vibrations. However, virtually all periodic variations in the torque applied to a drill string will cause uncontrolled accelerations of the various components making up the drill string, including the rotary table, bit, and BHA. Like a stick-slip phenomena, these uncontrolled accelerations of the drill string may cause damage to the bit, any tools in the BHA, and may also cause wiping damage to the walls of the wellbore.

There are a number of physical mechanisms associated with torsional vibration that may be damaging to the bit and drill string. First, torsional vibrations introduce cyclic stresses that accompany the non-uniform rotational motion of the drill string. Persistent twisting and unwinding of the drill string can lead to stalling of the drill string and overloading of connections, while fluctuating bit speed may cause fatigue failure of the cutting elements on the bit. Second, bursts of lateral BHA vibration can accompany the rotational accelerations of the BHA. These bursts can produce bending stresses that can ultimately cause connection failure or impact damage to sensitive components in the BHA, such as measurement while drilling (MWD) tools. Third, intermittent periods of backward BHA/Bit rotation may occur during stick-slip conditions, a phenomena that may lead to twist-offs. Finally, lengthening of the drill string due to uncontrolled forward rotation may drive the bit into the cutting face, leading to a stalled condition and a renewed stick-slip cycle.

The undesirable character of the physical phenomena associated with torsional vibrations are amplified by the relative ease with which torsional vibrations can be initiated in a drill string, the persistence of such torsional vibrations once initiated, and the minimal damping associated with low frequency forms of torsional vibration in a drill string. Most drill strings have a relatively low torsional stiffness. As a consequence, small torque fluctuations downhole can produce large rotational displacement. Once initiated, the torsional waves propagating along the drill pipe are reflected downhole by the relatively high impedance of the rotary table, and a self-perpetuating transfer of energy is created between the drill pipe and BHA sections that can build into full stick-slip behavior which may persist until conditions are changed.

If the driller is able to perceive the magnitude of the torsional vibrations active in the drill string, steps may be taken to alleviate a potentially damaging situation, such as increasing the rotary table speed or decreasing the weight on the bit (WOB). However, traditional drilling rig systems supply the driller with four basic parameters. Rotary table torque, rotary table speed, hook load, and stand pipe pressure. Although the readings from a typical meter showing rotary table torque will vary sinusoidally during stick-slip conditions, these analog meters merely represent a snapshot picture of the applied torque at a given instant, and cannot depict torsional vibrations usefully.

Previous attempts to sense and analyze torsional vibrations in a drill string have commonly centered on directly sensing vibrations using accelerometers encased in a measurement sub in the BHA or sensing and analyzing the current drawn by the rotary table. The former systems require the insertion of a potentially costly measurement sub and telemetering system which may be subject to failure along with the other tools in the BHA due to exposure to torsional vibrations. Furthermore, traditional telemetering systems do not render data readings on a real time basis. In addition, these measurement sub systems have traditionally relayed data to an analysis lab as opposed to the drill floor where the information is needed by the driller.

The other system used for automatically sensing and analyzing torsional vibrations in a drill string noted above combines a current sensor coupled to the power input to the rotary table with a computer program that analyzes the electrical signal produced by the current sensor. The program produces a plot of the standard deviation of the torque, (sigma torque), applied to the drill string as a function of time. In this system, a maximum per permissible standard deviation of the torque magnitude is specified based on empirical data. A rig floor alarm, in the form of a traffic signal light, is coupled to the system to warn the driller of potentially damaging high sigma torque situations. The system is configured so that an amber or red light will illuminate in the rig alarm whenever the maximum permissible standard deviation of the applied torque is exceeded.

Although the standard deviation sensing system eliminates the need for a costly and potentially failure-prone sensor sub, there are nevertheless disadvantages associated with such a system. The information displayed by the standard deviation system is, by and large, qualitative and requires human visual interpretation of the signal trace to determine whether a torsional vibration event is occurring.

The present invention is directed to overcoming, or at least minimizing, one or more of the foregoing disadvantages.

SUMMARY OF THE INVENTION

In accordance with one aspect of the present invention, there is provided an apparatus for sensing and displaying torsional vibrations of a rotating member. The apparatus includes a transducer for producing a first signal correlative to torsional vibrations in the rotating member. A spectrum analyzer converts the first signal into a frequency-domain signal having a magnitude correlative to a magnitude of torsional vibrations in the rotating member. The spectrum analyzer produces a second signal correlative to the magnitude of torsional vibrations in the rotating member. A display provides an indication correlative to the magnitude of torsional vibrations in the rotating member.

In accordance with another aspect of the present invention, there is provided an apparatus for sensing torsional vibrations in a drill string and providing a display having a magnitude correlative to a magnitude of the torsional vibrations to an operator located on a drilling floor. The apparatus includes a transducer for producing a first signal correlative to torsional vibrations in the drill string. A spectrum analyzer converts the first signal into a frequency-domain signal having a magnitude correlative to the magnitude of torsional vibrations in the drill string and delivers a second signal correlative to the magnitude of torsional vibrations in the drill string. A display is located adjacent the drilling floor. The display receives the second signal and displays an indication correlative to the magnitude of torsional vibrations in the drill string.

In accordance with a further aspect of the present invention, there is provided an apparatus for sensing torsional vibrations in a drill string and displaying an indication of the torsional vibrations to an operator located on a drilling floor. The apparatus includes a current-sensing transducer coupled to a motor for rotating the drill string. The current-sensing transducer produces a first signal correlative to torsional vibrations in the drill string. A low pass filter receives the first signal, passes frequencies of the first signal containing information correlative to torsional vibrations in the drill string, and delivers a second signal correlative thereto. A high pass filter receives the second signal, removes a d.c. component of the second signal, and delivers a third signal correlative to torsional vibrations in the drill string. A spectrum analyzer receives the third signal and converts the third signal into a frequency spectrum. The frequency spectrum has a magnitude correlative to the magnitude of torsional vibrations in the drill string. A peak detector detects a magnitude of at least one peak of the frequency spectrum and produces a fourth signal correlative to the magnitude of at least one peak. A display is located adjacent the drilling floor. The display receives the fourth signal and displays a magnitude correlative to the magnitude of torsional vibrations in the drill string.

In accordance with yet another aspect of the present invention, there is provided an apparatus for sensing and displaying torsional vibrations of a rotating member. The apparatus includes (1) means for producing a first signal correlative to torsional vibrations in the rotating member, (2) means for producing a frequency spectrum of the first signal, where the frequency spectrum has a magnitude correlative to a magnitude of torsional vibrations in the rotating member, and for producing a second signal correlative to the magnitude of torsional vibrations in the rotating member, and (3) means for displaying an indication of the magnitude of torsional vibrations in the rotating member in response to receiving the second signal.

In accordance with still another aspect of the present invention, there is provided a method for sensing and displaying torsional vibrations of a rotating member. The method includes the steps of: (a) producing a first signal correlative to torsional vibrations in the rotating member; (b) producing a frequency spectrum of the first signal, where the frequency spectrum has a magnitude correlative to a magnitude of torsional vibrations in the rotating member, and producing a second signal correlative to the magnitude of torsional vibrations in the rotating member; and (c) producing an indication of the magnitude of torsional vibrations in the rotating member in response to receiving the second signal.

In accordance with a still further aspect of the present invention, there is provided a method for sensing torsional vibrations in a drill string and displaying an indication of the torsional vibrations to an operator located on a drilling floor. The method includes the steps of: (a) producing a first signal correlative to torsional vibrations in the drill string; (b) passing frequencies of the first signal containing information correlative to torsional vibrations in the drill string and delivering a second signal correlative thereto; (c) removing a d.c. component of the second signal and delivering a third signal correlative to torsional vibrations in the drill string; (d) producing a frequency spectrum of the third signal, where the frequency spectrum has a magnitude correlative to the magnitude of torsional vibrations in the drill string; (e) detecting a magnitude of at least one peak of the frequency spectrum and producing a fourth signal correlative to the magnitude of the at least one peak; and (f) locating a display adjacent the drilling floor, where the display receives the fourth signal and displays a magnitude correlative to the magnitude of torsional vibrations in the drill string.

BRIEF DESCRIPTION OF THE DRAWINGS

The foregoing and other advantages of the invention will become apparent upon reading the following detailed description and upon reference to the drawings in which.

Figure 1:
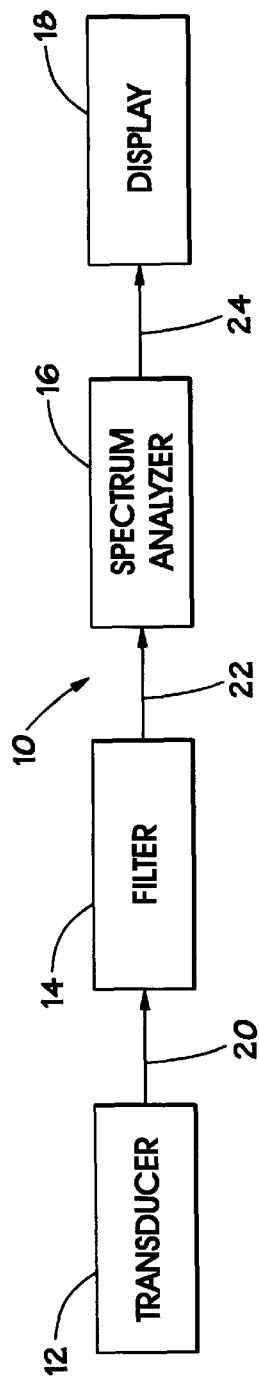
FIG. 1 is a general block diagram illustrating a method and apparatus for sensing and displaying torsional vibration.

While the invention is susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the appended claims.

DESCRIPTION OF SPECIFIC EMBODIMENTS

Turning now to the drawings and referring initially to FIG. 1, a method and apparatus for sensing and displaying torsional vibration is illustrated and generally designated by a reference numeral 10. The apparatus 10 includes a transducer 12, a filter 14, a spectrum analyzer 16, and a display 18.

Although the apparatus 10 may be used in various areas, it finds particular utility when used to sense and display torsional vibration experienced by a rotating member, such as a drill string (not shown). As is well known in the art, a drill bit is typically coupled to one end of a drill string, while the upper end of the drill string is coupled to a motor-driven rotary table on the drilling floor at the surface. The rotary table imparts a torque onto the drill string to rotate the bit at the opposite end of the drill string. However, as mentioned previously, other downhole events may occur and impart torque to the drill string.

The transducer 12 is provided to sense a parameter relative to the torque imparted onto the drill string. Because a number of different parameters may be correlative to the torque imparted onto the drill string, the transducer 12 may take a number of different forms. For instance, the current of the motor driving the rotary table fluctuates in response to torsional loads experienced by the drill string. As the torsional load on the drill string increases, the motor current increases in an attempt to overcome the load. Motor current may be sensed by placing a commercially available current sensor around the motor's power cord. Such sensors are Hall-effect type sensors which sense the magnetic flux in the current-carrying conductors of the motor's power cord and convert the flux into a voltage signal correlative to the amount of current passing through the conductors. Alternatively, sensors may be placed on the motor's windings or on the motor's stator to sense torque variations experienced by the motor. Also, sensors are available that measure torque directly on the drill string. In fact, if a hydraulic motor is used to turn the drill string, the pressure of the fluid (or variations thereof) flowing to the motor may be sensed, e.g., using pressure sensors, to generate a signal correlative to torque in the drill string.

The speed, or speed variations, of the motor can also be indicative of the torque, or torsional vibrations, experienced by the drill string. Thus, the rotary speed of the motor, of the rotary table, or of the drill string may be sensed, and the speed, or fluctuations in speed, may be indicative of torsional loads or torsional vibrations experienced by the drill string.

The filter 14 receives the signal from the transducer 12. The filter 14 removes unwanted components of the electrical signal so that these components will not interfere with further processing. Experience shows that most torsional vibrations occur in the range of 0.1 Hz to 4.0 Hz. Accordingly, the filter 14 may remove components of the transducer signal below 0.1 Hz and above 4.0 Hz, since these signals typically will not carry much, if any, information related to the torsional vibrations experienced by the drill string.

The spectrum analyzer 16 receives the filtered signal from the filter 14 on line 22. The spectrum analyzer 16 converts the time-domain signal from the filter 14 into a frequency-domain signal often called the frequency spectrum. The frequency-domain signal, as will be described in more detail below, represents the magnitudes of different frequency components of the signal from the filter 14. Thus, the frequency-domain signal represents the magnitude of torsional vibration being experienced by the drill string, as well as the frequency at which the torsional vibration is occurring.

The operator on the drilling floor controls the drilling operation. To alleviate a stick-slip condition, the operator has the ability to alter the speed at which the rotary table operates, as well as the ability to move the drill string in an axial direction, to alleviate a stick-slip condition. Under current practice, the operator is not aware that a stick-slip condition exists until the stick-slip condition has become fairly critical and possibly caused damage to the drill string. Therefore, it would be advantageous to provide the operator with a display to indicate to the operator the existence of a stick-slip condition, or to indicate to the operator the magnitude of torsional vibration being experienced by the drill string which may be indicative of a stick-slip condition or of the onset of such a condition. Accordingly, the frequency-domain signal, or a signal correlative thereto, is delivered to one or more operator displays 18 on the line 24. The display 18 may take a number of forms to warn the operator of a stick-slip condition. Two such forms will be discussed in greater detail in reference to FIG. 2.

Figure 2:
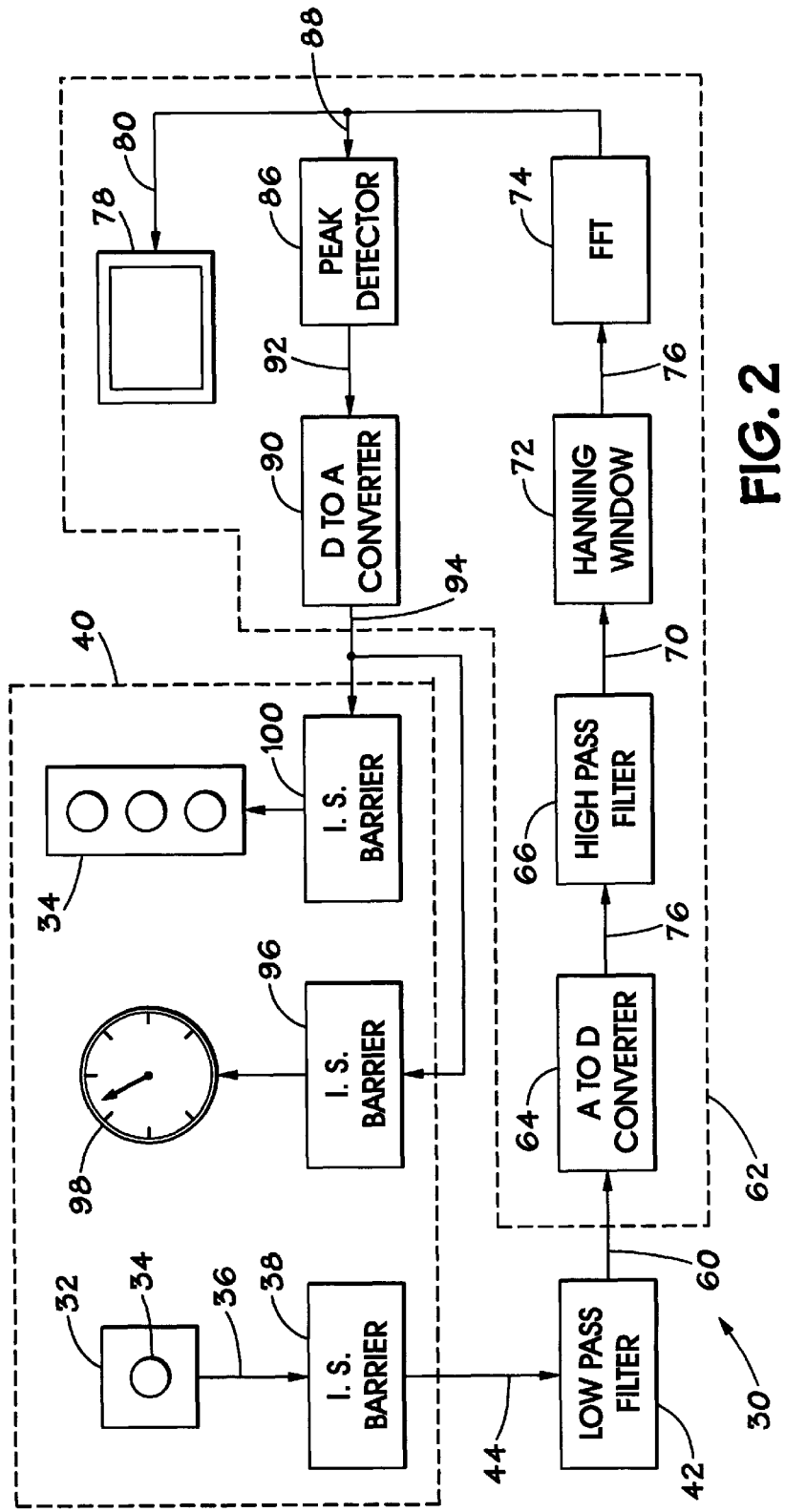
FIG. 2 is a detailed block diagram illustrating a method and apparatus for sensing and displaying torsional vibration.

One specific embodiment of an apparatus for sensing and displaying torsional vibrations is illustrated in FIG. 2 and is generally designated by the reference numeral 30. The apparatus 30 uses a current sensor 32 to sense the current of the motor driving the rotary table. The illustrated current sensor 32 is a Hall-effect current sensor that is placed around the power cord (not shown) of the rotary table motor. Specifically, the power cord passes through the aperture 34 in the current sensor 32. The current sensor 32 converts the magnetic flux produced by the current passing through the conductors in the power cord into a voltage signal, and the current sensor 32 delivers this voltage signal on line 36 to an intrinsically safe barrier 38. This signal is indicative of the torque on the motor and, thus, the torque on the drill string. Electrical signals passing to or from the drill floor 40 typically pass through an intrinsically safe barrier, such as the barrier 38, as is known in the art.

The torque signal passes from the barrier 38 to a low pass filter 42 on line 44. As stated previously, experience has shown that torsional vibrations or a drill string typically occur between 0.1 Hz and 4.0 Hz. Accordingly, vibrations in a frequency band above about 4.0 Hz are typically not torsionally induced. Hence, the low pass filter 42 may be configured to pass all energy from 0 to 4.0 Hz and to attenuate energy above 4.0 Hz. In the event that some energy above 4.0 Hz might be correlative to torsional vibrations or to harmonics associated therewith, the low pass filter may be set to a higher cut-off frequency, such as 5 Hz or 10 Hz.

Figure 3:
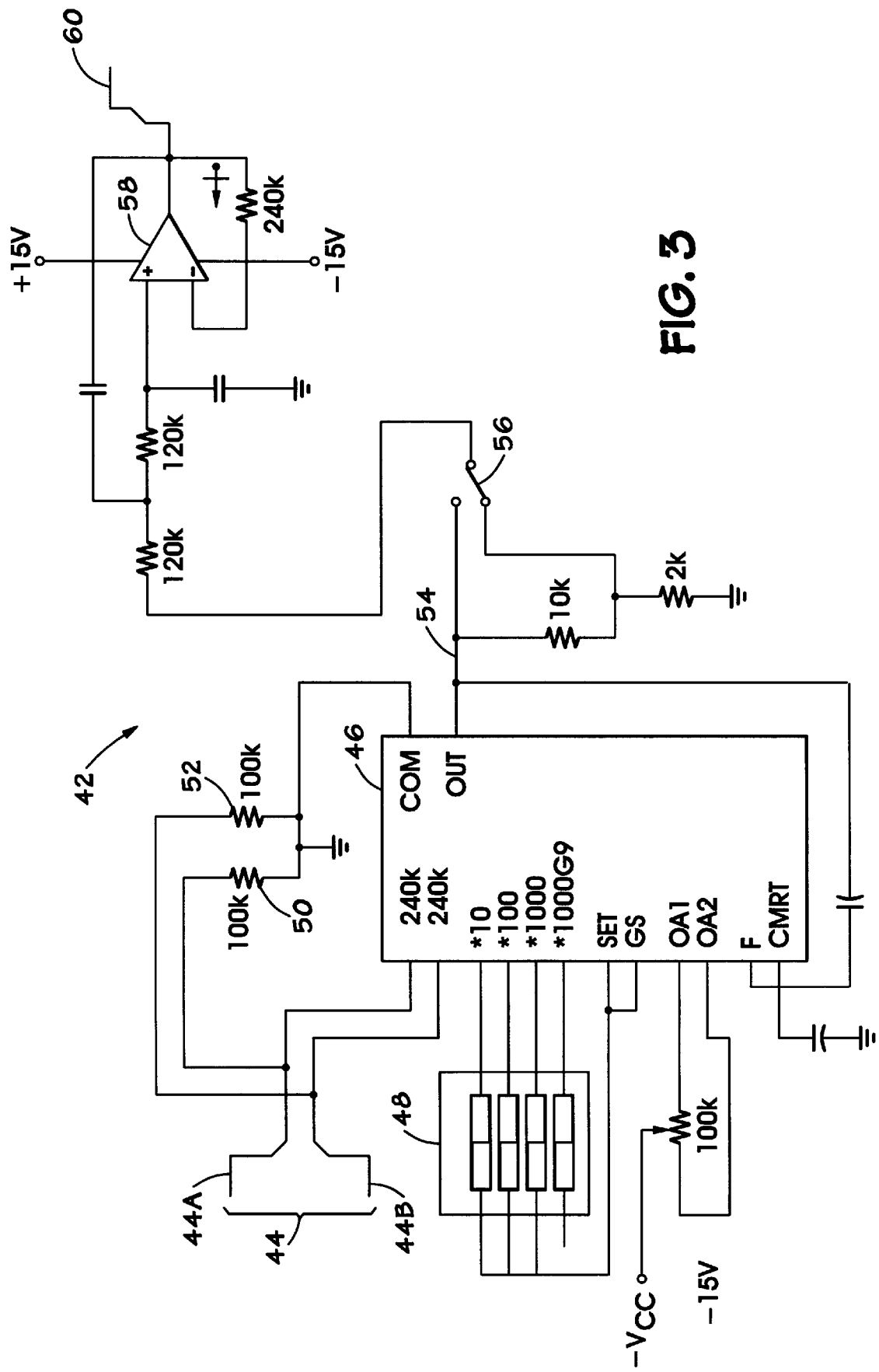
FIG. 3 is a schematic diagram of one example of a low pass filter for use with the apparatus illustrated in FIG. 2.

In one specific embodiment, the low pass filter 42 is an analog filter that operates on the analog torque signal. One such filter is illustrated in FIG. 3. The torque signal is delivered to the low pass filter 42 on line 44, which is comprised of lines 44a and 44b. In other words, the torque signal appears at the input to the low pass filter 42 as a differential signal. The torque signal is delivered on lines 44a and 44b to the inputs of an instrumentation amplifier 46. A set of dip switches 48 controls the gain of the instrumentation amplifier 46, which is basically a differential amplifier. In this embodiment, the dip switches 48 are set to provide the instrumentation amplifier 46 with a unity gain. Because the instrumentation amplifier 46 has a very high input impedance, bias current resistors 50 and 52 are placed in a feedback loop to lower this input resistance.

The low pass filter 42 illustrated in FIG. 3 is a two-stage, or two-pole, filter. The components of the filter 42 described thus far constitute the first stage. Thus, the output of the instrumentation amplifier 46 on line 54 carries a signal having a particular cut-off frequency and roll-off rate. In this particular example, the cut-off frequency is 3.6 Hz, and the roll-off rate is 20 dB/decade. The filtered signal on line 54 passes through a switch 56 which in this position, divides the signal by the resistor ratio. The filtered signal on line 54 is delivered to the second stage of the filter 42 that, in this embodiment, is a "Salon and Key" filter. This second stage of the filter 42 includes an operational amplifier 58 having a unity gain. The elements connected to the operational amplifier are selected to provide a second cut-off frequency and a second desired roll-off rate. In this embodiment, the second filter stage provides a cut-off frequency of 4.2 Hz, and it provides a total roll-off rate for the torque signal of 40 dB/decade. Thus, the magnitude of the filtered torque signal appearing at the output of the low pass filter on line 60 passes through zero at about 5.0 Hz.

Referring again to the apparatus 30 of FIG. 2, the filtered torque signal on line 60 is delivered to a computer 62, such as an IBM compatible personal computer. The computer 62 includes an A-to-D converter 64 that converts the analog, filtered torque signal of line 60 into a digital signal. While a variety of off-the-shelf A-to-D converters might be used, in one particular embodiment the A-to-D converter 64 is a 12 bit converter. The operation of the computer 62 under software control will be described generally below.

The digital version of the filtered torque signal is delivered to a high pass filter 66 on line 68. It should be understood that the lines described herein are used for purposes of illustration only, as line 68 may be a bus having multiple conductors or some other combination of hardware and/or software. The high pass filter 66 is a digital filter, which may be implemented using software and/or hardware, that is designed to remove the DC component from the filtered torque signal. In this embodiment, the high pass filter 66 is selected to pass frequencies of 0.01 Hz and higher.

In this embodiment, the filtered torque signal is delivered via line 70 to a Hanning window 72. The Hanning window 72 is a well known window function used in conjunction with digital filters to provide a more uniform frequency response and a more manageable digital signal.

Figure 4A:
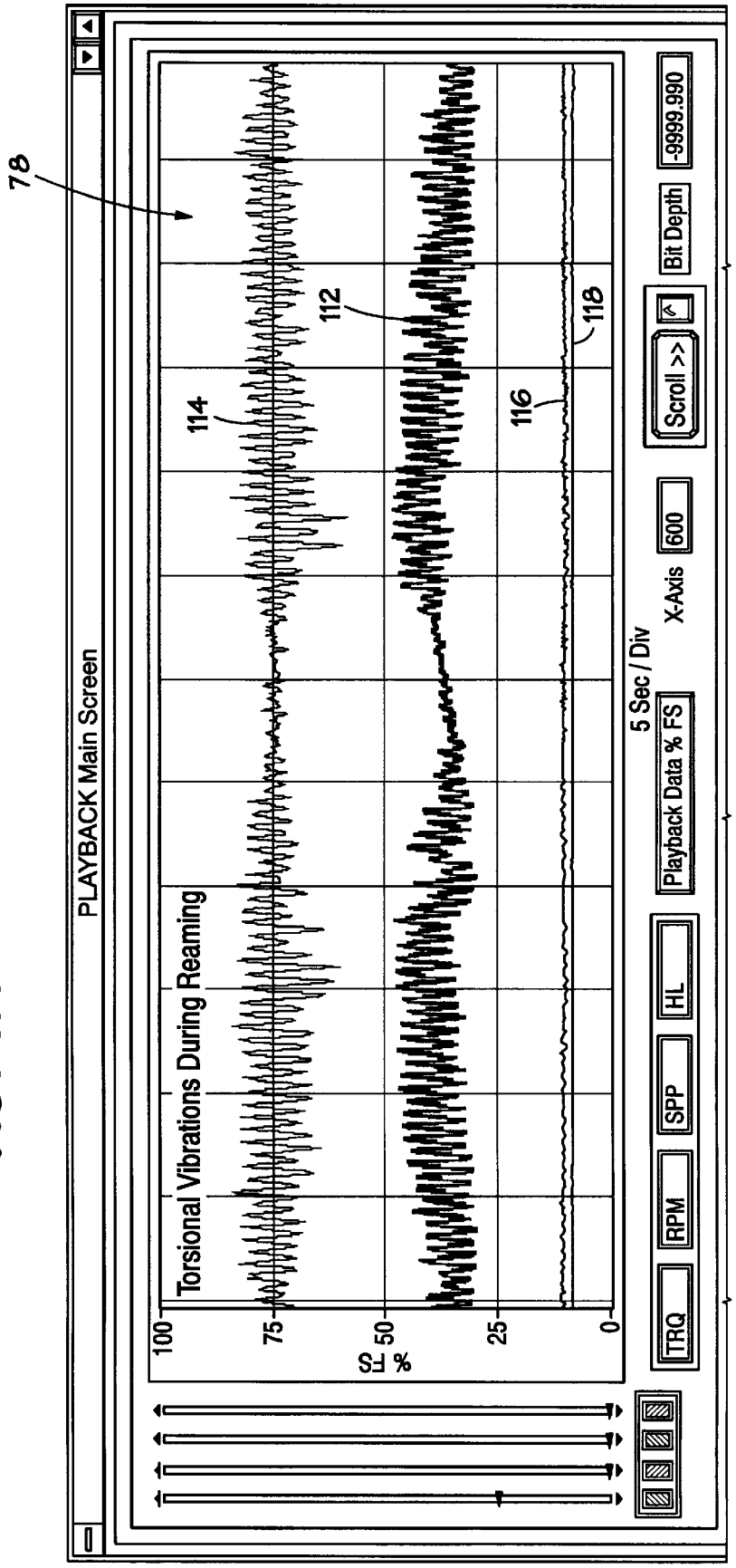
FIG. 4 is one example of a personal computer display generated by the method and apparatus for sensing and displaying torsional vibration.
Figure 4B:
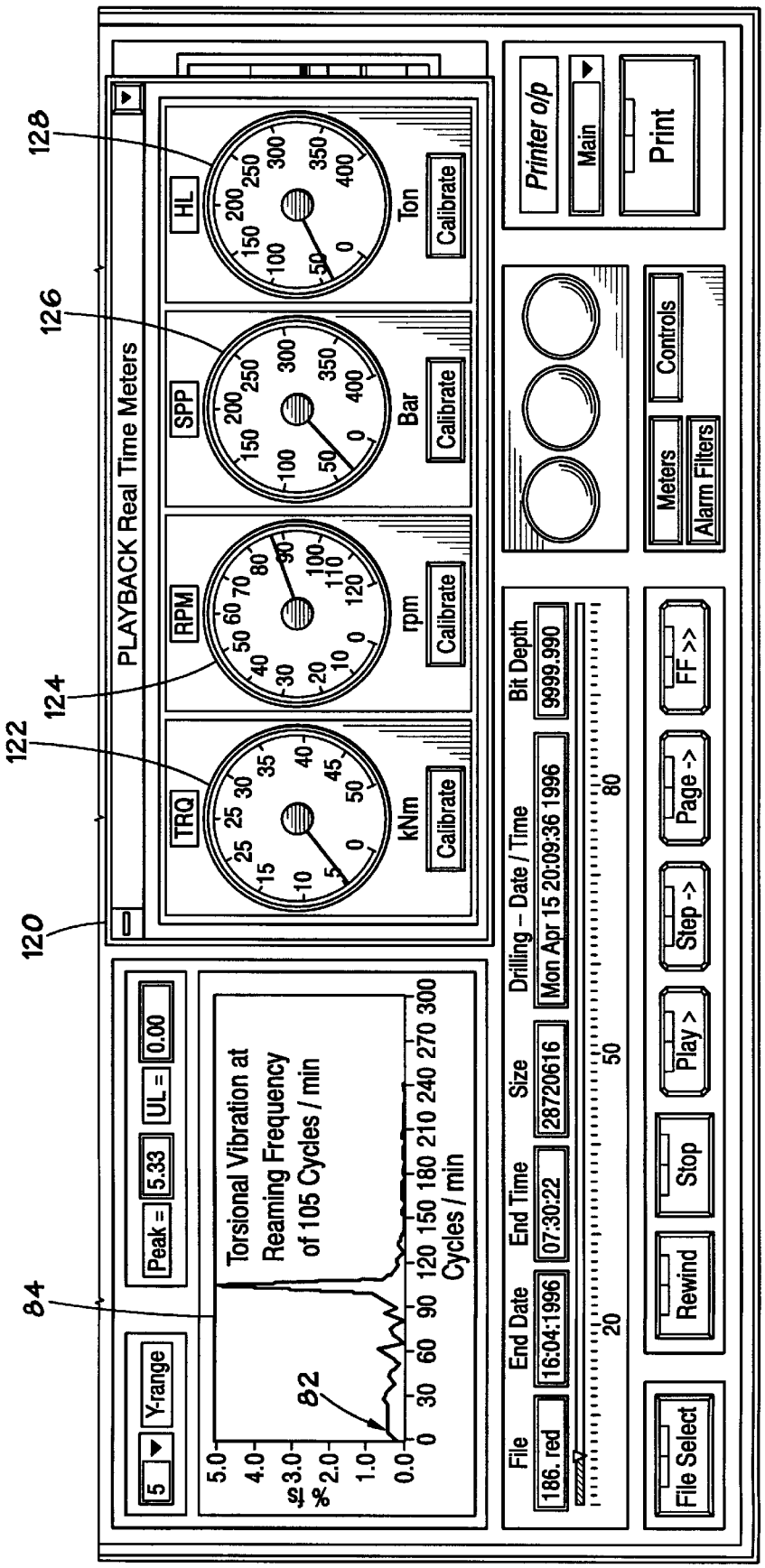

The Hanning window 72 delivers the torque signal to a fast fourier transform 74 via line 76. Like the Hanning window function, the fast fourier transform function is well known in the area of digital processing. The FFT 74 converts the time-domain torque signal on line 76 into a frequency-domain torque signal. The FFT 74 may deliver the frequency-domain signal, commonly called the frequency spectrum, to a display monitor 78 via line 80. One such display monitor 78 is illustrated in FIG. 4. A frequency spectrum 82 is illustrated in the chart 84 located on the lower left side of the display 78. In this example, it can be seen that the frequency spectrum 82 carries relatively little energy except at about 105 cycles per minute. However, at about 105 cycles per minute, the frequency spectrum 82 illustrates a torsional vibration of relatively high magnitude.

To provide the operator on the drill floor 40 with information relating to the magnitude of a torsional vibration sensed by the apparatus 30, the FFT 74 provides the frequency spectrum 82 to a peak detector 86 via line 88. The peak detector 86 may take different forms. For instance, the peak detector 86 may simply select the highest peak on the frequency spectrum 82 and deliver the magnitude of that peak to a display on the drill floor 40. Alternatively, the peak detector 86 may select a number of different peaks, or determine the total power in the frequency spectrum 82, and deliver a correlative magnitude to a display on the drill floor 40. Regardless of what methodology is selected, the peak detector 86 delivers a signal correlative to the frequency spectrum 82 to a D-to-A converter 90 via line 92. The D-to-A converter 90 converts the digital signal on line 92 to an analog signal and outputs the analog signal on line 94. Thus, the analog signal on line 94 is correlative to the torsional vibrations experienced by the drill string.

The analog signal on line 94 is delivered to one or more displays on the drilling floor 40 so that an operator on the drilling floor 40 can adjust the speed and/or axial position of the drill string in response to the displayed information. Of course, before reaching the drilling floor 40, the analog signal on line 94 passes through an intrinsically safe barrier before reaching a display. In this embodiment, the analog signal on line 94 passes through a barrier 96 before reaching a display 98, and it passes through an intrinsically safe barrier 100 before reaching a display 102.

The display 98 may be an analog or digital display placed near the operator on the drilling floor 40. The display 98 provides the operator with the magnitude of the torsional vibrations being experienced by the drill string. However, possibly more important than the magnitude of such vibrations may be the change in the magnitude of the vibrations. Hence, the display 98 is advantageously relatively sensitive to changes in the magnitude of torsional vibration so that the operator can more easily identify a stick-slip condition.

The other display 102 advantageously takes the form of a traffic light. The traffic light 102 includes a green lamp 104, an amber lamp 106, and a red lamp 108. The lamps 104, 106, and 108 may be configured by the traffic light display 102 to illuminate in response to magnitudes of torsional vibration in particular ranges.

For instance, for magnitudes of torsional vibrations in a low range, the green lamp 104 of the traffic light display 102 is illuminated. This indicates to the operator an absence of substantial torsional vibrations so that the operator may proceed with the drilling procedure. For magnitudes of torsional vibrations in a medium range, the amber light 106 on the traffic light display 102 is illuminated. The amber light 106 indicates that torsional vibrations are present, possibly indicating the presence of a stick-slip condition. However, these vibrations are not high enough in magnitude for the operator to cease the drilling procedure. Rather, the illumination of the amber light 106 indicates that the operator should take some measures to alleviate the stick-slip condition. These measures may include changing the speed at which the drill string is rotating or changing the axial position of the drill string. For a higher range of magnitudes of torsional vibrations, the red lamp 108 on the traffic light display 102 is illuminated. Illumination of the red lamp 108 indicates the presence of torsional vibrations having a high magnitude and, thus, the presence of a more severe stick-slip condition. Thus, illumination of the red lamp 108 indicates to the operator that the drilling procedure should be halted to prevent damage to the drill string.

Parameters of this nature may also be provided to the computer display monitor 78. Although the embodiment illustrated in FIG. 2 has been described as using a signal representative of the torque on the drill string sensed by placing a current transducer about the motor's power cord, other signals may be sensed. As shown in the upper chart 110 in FIG. 4, not only may the torque signal 112, i.e., the signal appearing on line 44, be sensed, other signals may be sensed as well. For instance, the speed of the motor may be sensed and displayed as illustrated by the signal 114. Also, the hook load and the stand-pipe pressure may be sensed and displayed as illustrated by the signals 116 and 118, respectively. These signals may also be used as inputs to real time meters, such as the meters illustrated in the display window 120 in the lower right hand portion 78. The display meters 122, 124, 126, and 128 display the torque, RPM, stand pipe pressure, and hook load, respectively, in a manner more easily decipherable by humans than the display illustrated in the chart 110.

Of these other signals measured by the apparatus 30, the speed of the motor, rotary table, or drill string may be used to indicate the amount of torque, and thus torsional vibrations, present on the drill string. As torque induced by a stick-slip condition rises, the speed of the drill string slows. Thus, the speed signal correlates well to the torsional vibrations experienced by the drill string.

It is believed that by determining the magnitude of the torsional vibration experienced by the drill string and providing this information to the operator that drill string failures will decrease. As stated previously, specific embodiments have been shown by way of example in the drawings and described in detail herein. However, the invention is to cover all modifications, equivalents, and alternatives falling within the spirit and scope of the invention as defined by the appended claims.

What is claimed is:

1. An apparatus for sensing torsional vibrations in a drill string and providing a display having a magnitude correlative to a magnitude of said torsional vibrations to an operator located on a drilling floor, said apparatus comprising:

a transducer producing a first signal correlative to torque in said drill string;

a spectrum analyzer receiving said first signal and converting said first signal into a frequency-domain signal, said frequency-domain signal having a magnitude correlative to the magnitude of torsional vibrations in said drill string; and a display located adjacent said drilling floor, said display receiving said frequency-domain signal and displaying an indication correlative to the magnitude of torsional vibrations in said drill string.

2. The apparatus, as set forth in claim 1, further comprising a peak detector receiving said frequency-domain signal, said peak detector measuring a magnitude of at least one peak of said frequency-domain signal and producing a second signal correlative to said magnitude of said at least one peak.

3. The apparatus, as set forth in claim 1, wherein the display displays an indication correlative to a change in the magnitude of torsional vibrations of the rotating member.

4. An apparatus for sensing and displaying torsional vibrations of a rotating member, said apparatus comprising:

a transducer producing a first signal correlative to torsional vibrations in said rotating member;

a spectrum analyzer receiving said first signal and converting said first signal into a frequency-domain signal, said frequency-domain signal having a magnitude correlative to a magnitude of torsional vibrations in said rotating member;

a peak detector receiving said frequency-domain signal, said peak detector measuring a magnitude of at least one peak of said frequency-domain signal and producing a second signal correlative to said magnitude of said at least one peak; and a display positioned proximate a drill string operator receiving said second signal and displaying an indication correlative to the magnitude of torsional vibrations in said rotating member.

5. The apparatus, as set forth in claim 4, wherein the peak detector measures a magnitude of a single peak of the frequency-domain signal.

6. The apparatus, as set forth in claim 4, wherein the peak detector measures a magnitude of a plurality of peaks of the frequency-domain signal.

7. The apparatus, as set forth in claim 4, wherein the peak detector measures a magnitude of total power of the frequency-domain signal.

8. The apparatus, as set forth in claim 4, wherein the display displays an indication correlative to a change in the magnitude of torsional vibrations of the rotating member.

9. The apparatus, as set forth in claim 4, wherein the display is located adjacent a drilling floor.

10. An apparatus for sensing torsional vibrations in a drill string and displaying an indication of said torsional vibrations to an operator located on a drilling floor, said apparatus comprising:

a current-sensing transducer coupled to a motor coupled to rotate said drill string, said current-sensing transducer producing a first signal correlative to torsional vibrations in said drill string;

a low pass filter receiving said first signal, said low pass filter passing frequencies of said first signal containing information correlative to torsional vibrations in said drill string and delivering a second signal correlative thereto;

a high pass filter receiving said second signal, said high pass filter removing a d.c. component of said second signal and delivering a third signal correlative to torsional vibrations in said drill string;

a spectrum analyzer receiving said third signal and performing a fourier transform on said third signal to convert said third signal into a frequency spectrum, said frequency spectrum having a magnitude correlative to the magnitude of torsional vibrations in said drill string;

a peak detector receiving said frequency spectrum, said peak detector measuring a magnitude of at least one peak of said frequency spectrum and producing a fourth signal correlative to said magnitude of said at least one peak; and a display located adjacent said drilling floor, said display receiving said fourth signal and displaying a magnitude correlative to the magnitude of torsional vibrations in said drill string.

11. The apparatus, as set forth in claim 10, wherein the peak detector measures a magnitude of a single peak of the frequency spectrum.

12. The apparatus, as set forth in claim 10, wherein the peak detector measures a magnitude of a plurality of peaks of the frequency spectrum.

13. The apparatus, as set forth in claim 10, wherein the peak detector measures a magnitude of total power of the frequency spectrum.

14. The apparatus, as set forth in claim 10, wherein the display displays an indication correlative to a change in the magnitude of torsional vibrations of the rotating member.

15. An apparatus for sensing and displaying torsional vibrations of a rotating member, said apparatus comprising:

means for producing a first signal correlative to torsional vibrations in said rotating member;

means for producing a frequency spectrum of said first signal, said frequency spectrum having a magnitude correlative to a magnitude of torsional vibrations in said rotating member;

means for measuring a magnitude of at least one peak of said frequency spectrum and producing a second signal correlative to said magnitude of said at least one peak; and means for displaying to an operator an indication of said magnitude of torsional vibrations in said rotating member in response to receiving said second signal.

16. A method for sensing and displaying torsional vibrations of a rotating member, said method comprising the steps of:

(a) producing a first signal correlative to torsional vibrations in said rotating member;

(b) producing a frequency spectrum of said first signal, said frequency spectrum having a magnitude correlative to a magnitude of torsional vibrations in said rotating member;

(c) measuring a magnitude of at least one peak of said frequency spectrum and producing a second signal correlative to said magnitude of said at least one peak;

(d) displaying to operator an indication of said magnitude of torsional vibrations in said rotating member in response to receiving said second signal, and (e) controlling weight on or speed of the rotating member in response to displayed indication of said magnitude of torsional vibrations in said rotating member in response to receiving said second signal.

17. A method for sensing torsional vibrations in a drill string and displaying an indication of the torsional vibrations to an operator located on a drilling floor, said method comprising the steps of:

(a) producing a first signal correlative to torsional vibrations in said drill string;

(b) passing frequencies of said first signal containing information correlative to torsional vibrations in said drill string and delivering a second signal correlative thereto;

(c) removing a d.c. component of said second signal and delivering a third signal correlative to torsional vibrations in said drill string;

(d) producing a frequency spectrum of said third signal, said frequency spectrum having a magnitude correlative to the magnitude of torsional vibrations in said drill string;

(e) measuring a magnitude of at least one peak of said frequency spectrum and producing a fourth signal correlative to said magnitude of said at least one peak; and (f) locating a display adjacent said drilling floor, said display receiving said fourth signal and displaying a magnitude correlative to the magnitude of torsional vibrations in said drill string.

* * * * *